(12) United States Patent
Miyahara

(10) Patent No.: US 7,561,720 B2
(45) Date of Patent: Jul. 14, 2009

(54) SINGLE CAMERA SYSTEM AND METHOD FOR RANGE AND LATERAL POSITION MEASUREMENT OF A PRECEDING VEHICLE

(75) Inventor: Shunji Miyahara, Yokohama (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 946 days.

(21) Appl. No.: 10/836,501

(22) Filed: Apr. 30, 2004

(65) Prior Publication Data

US 2005/0244034 A1 Nov. 3, 2005

(51) Int. Cl.
*G06K 9/00* (2006.01)
(52) U.S. Cl. ............. 382/104; 382/106; 382/199; 348/140; 348/148; 348/149
(58) Field of Classification Search ............. 382/103, 382/106, 104, 199; 340/435, 937; 701/96, 701/116, 117, 300, 301; 348/113, 148, 199
See application file for complete search history.

(56) References Cited

U.S. PATENT DOCUMENTS

| | | | | |
|---|---|---|---|---|
| 4,931,937 | A | * | 6/1990 | Kakinami et al. ......... 701/300 |
| 4,970,653 | A | | 11/1990 | Kenue |
| 5,487,116 | A | * | 1/1996 | Nakano et al. .......... 382/104 |
| 5,515,448 | A | | 5/1996 | Nishitani |
| 5,555,312 | A | | 9/1996 | Shima et al. |
| 5,555,555 | A | | 9/1996 | Sato et al. |
| 5,557,323 | A | * | 9/1996 | Kajiwara ................ 348/140 |
| 5,646,612 | A | | 7/1997 | Byon |

(Continued)

FOREIGN PATENT DOCUMENTS

JP 3170012 7/1991

(Continued)

OTHER PUBLICATIONS

Vision based ACC with a single camera: Bounds on range and range rate accuracy, Stein et al , IEEE 2003.*

(Continued)

*Primary Examiner*—Jingge Wu
*Assistant Examiner*—Nancy Bitar
(74) *Attorney, Agent, or Firm*—Brinks Hofer Gilson & Lione

(57) ABSTRACT

A system for determining range and lateral position of a vehicle is provided. The system includes a camera and a processor. The camera is configured to view a region of interest including the vehicle and generate an electrical image of the region. The processor is in electrical communication with the camera to receive the electrical image. The processor analyzes the image by identifying a series of windows within the image each window corresponds to features of the vehicle at a different target range. For example, from the perspective of the camera the vehicle will appear larger when it is closer to the camera than if it is further away from the camera. Accordingly, each window is sized proportional to the vehicle as it would appear at each target range. The processor evaluates characteristics in the electrical image within each window to identify the vehicle. A score is determined indicating the likelihood that certain characteristics of the electrical image actually correspond to the vehicle and also that the vehicle is at target range for that window.

44 Claims, 4 Drawing Sheets

U.S. PATENT DOCUMENTS

| | | | |
|---|---|---|---|
| 5,757,287 | A | 5/1998 | Kitamura et al. |
| 5,850,254 | A | 12/1998 | Takano et al. |
| 5,930,383 | A | 7/1999 | Netzer |
| 6,021,209 | A * | 2/2000 | Hirabayashi et al. ........ 382/103 |
| 6,205,234 | B1 | 3/2001 | Kakinami et al. |
| 6,285,393 | B1 | 9/2001 | Shimoura et al. |
| 6,327,536 | B1 | 12/2001 | Tsuji et al. |
| 6,430,303 | B1 * | 8/2002 | Naoi et al. ................... 382/104 |
| 6,445,809 | B1 | 9/2002 | Sasaki et al. |
| 6,463,369 | B2 | 10/2002 | Sadano et al. |
| 6,470,271 | B2 | 10/2002 | Matsunaga |
| 6,477,260 | B1 * | 11/2002 | Shimomura ................. 382/106 |
| 6,484,086 | B2 | 11/2002 | Jeon |
| 6,535,114 | B1 | 3/2003 | Suzuki et al. |
| 6,590,521 | B1 * | 7/2003 | Saka et al. ..................... 342/70 |
| 6,665,439 | B1 | 12/2003 | Tatakashi |
| 6,754,369 | B1 | 6/2004 | Sazawa |
| 6,775,395 | B2 | 8/2004 | Nishigaki et al. |
| 6,823,261 | B2 | 11/2004 | Sekiguchi |
| 6,834,232 | B1 | 12/2004 | Malhotra |
| 6,985,075 | B2 * | 1/2006 | Takeda ........................ 340/435 |
| 7,042,389 | B2 * | 5/2006 | Shirai .......................... 342/70 |
| 7,231,288 | B2 * | 6/2007 | Koulinitch ................... 701/96 |
| 2002/0001398 | A1 | 1/2002 | Shimano et al. |
| 2002/0005778 | A1 | 1/2002 | Breed et al. |
| 2002/0131620 | A1 | 9/2002 | Shirato |
| 2002/0131621 | A1 | 9/2002 | Ohta |
| 2002/0134151 | A1 | 9/2002 | Naruoka et al. |
| 2002/0191837 | A1 * | 12/2002 | Takeda et al. ............... 382/154 |
| 2003/0001732 | A1 | 1/2003 | Furusho |
| 2003/0011509 | A1 | 1/2003 | Honda |
| 2003/0039546 | A1 | 2/2003 | Tseng |
| 2003/0076414 | A1 | 4/2003 | Sato et al. |
| 2003/0091228 | A1 | 5/2003 | Nagaoka et al. |
| 2003/0099400 | A1 | 5/2003 | Ishikawa |
| 2003/0108222 | A1 | 6/2003 | Sato et al. |
| 2003/0125855 | A1 | 7/2003 | Breed et al. |
| 2003/0235327 | A1 | 12/2003 | Srinivasa |
| 2004/0016870 | A1 | 1/2004 | Pawlicki et al. |
| 2004/0054473 | A1 | 3/2004 | Shimomura |
| 2004/0057601 | A1 | 3/2004 | Honda |
| 2004/0096082 | A1 | 5/2004 | Nakai et al. |
| 2004/0183906 | A1 | 9/2004 | Nagaoka et al. |
| 2004/0189512 | A1 | 9/2004 | Takashima et al. |
| 2004/0252863 | A1 | 12/2004 | Chang et al. |
| 2005/0001715 | A1 | 1/2005 | Itoh et al. |
| 2005/0015201 | A1 | 1/2005 | Fields et al. |
| 2005/0036660 | A1 | 2/2005 | Otsuka et al. |
| 2005/0063565 | A1 | 3/2005 | Nagaka et al. |
| 2006/0002587 | A1 * | 1/2006 | Takahama et al. ........... 382/103 |
| 2007/0031008 | A1 * | 2/2007 | Miyahara ..................... 382/106 |
| 2007/0035384 | A1 * | 2/2007 | Belcher et al. ........... 340/425.5 |
| 2007/0171033 | A1 * | 7/2007 | Nagaoka et al. ............. 340/435 |

FOREIGN PATENT DOCUMENTS

| | | |
|---|---|---|
| JP | 5020593 | 1/1993 |
| JP | 5313736 | 11/1993 |
| JP | 8083392 | 3/1996 |
| JP | 9016782 | 1/1997 |
| JP | 10-255019 | 9/1998 |

OTHER PUBLICATIONS

Leeuwen et al., Vehicle Detection with a Mobile Camera, IEEE Robotics & Automation Magazine, Mar. 2005, pp. 37-43.*

Detection and Classification of Vehicles, Surendra Gupte, Osama Masoud, Robert F.K. Martin, Nikolaos P. Papanikolopoulous, IEEE Transactions on Intelligent Transportation Systems, vol. 3, No. 1, Mar. 2002, pp. 37-47.

Detection and Avoidance of Simulated Potholes in Autonomous Vehicle Navigation in an Unstructured Environment, Jaiganesh Karuppuswamy, Vishnuvardhanaraj Selvaraj, Meyyappa Murugappa Ganesh and Ernest L. Hall, Center for Robotics Research, University of Cincinnati.

Stereo Vision-based Vehicle Detection, M. Bertozzi, A. Broggi, A. Fascioli, S. Nichele, IEEE Intelligent Vehicles Symposium, Oct. 3-5, 2002, pp. 39-44.

T. Kato, Y. Ninomiya and I. Masaki, An Obstacle Detection Method by Fusion of Radar and Motion Stereo, IEEE Intelligent Vehicles Symposium 2001, pp. 37-42, 2001.

Y. Fang, I. Masaki, B. Horn, Distance Range Based Segmentation in Intelligent Transportation Systems: Fusion of Radar and Binocular Stereo, pp. 171-176.

H. Higashida, R. Nakamura, M. Hitotsuya, K.F. Honda and N. Shima, Fusion Sensor for an Assist System or Low Speed in Traffic Congestion Using Millimeter-Wave and an Image Recognition Sensor, SAE Technical Paper Series, 2001-01-0880, 2001, pp. 1-5.

"Technology to Integrate a Vehicle-Mounted Camera and Image Processing Unit", Yoshiyuki Fukii, Hideki Tsukaoka, Jun. 2001, pp. 14-17.

"Obstacle Detection for Road Vehicles", Jorg Schutte.

"Use of Video Technology to Improve Automotive Safety Becomes More Feasible with Blackfin Processors", Source(s): http://www.analog.com/library/analogDialogue/archives/38-03/auto_safety.html.

Leeuweb et al., Vehicle Detection with a Mobile Camera, IEEE Robotics and Automation Magazine, Mar. 2005, pp. 37-43.

Sotelo et al., Road Vehicle Recognition in Monocular Images, IEEE ISIE 2005, Jun. 20-23, pp. 1471-1476.

Stein et al., Vision-based ACC with a single camera: bounds on range and range rate accuracy, IEEE Intelligent Vehicles Symposium 2003, Jun. 9-11, 2003, pp. 120-125.

"*Technology to Integrate a Vehicle-Mounted Camera and Image Processing Unit*", Yoshiyuki Fukii, Hideki Tsukaoka, Jun. 2001, pp. 14-17.

Mori et al. Shadow and Rhythm as Sign patterns of Obstacle Detection, 1993, IEEE International Symposium on Industrial Electronics, Conference Proceedings ISIE '93, pp. 271-277.

U.S. Patent and Trademark Office Action, U.S. Appl. No. 11/195,427, Dated Dec. 31, 2008.

U.S. Patent and Trademark Office Notice of Allowance, U.S. Appl. No. 11/049,502, Dated Nov. 13, 2008.

* cited by examiner

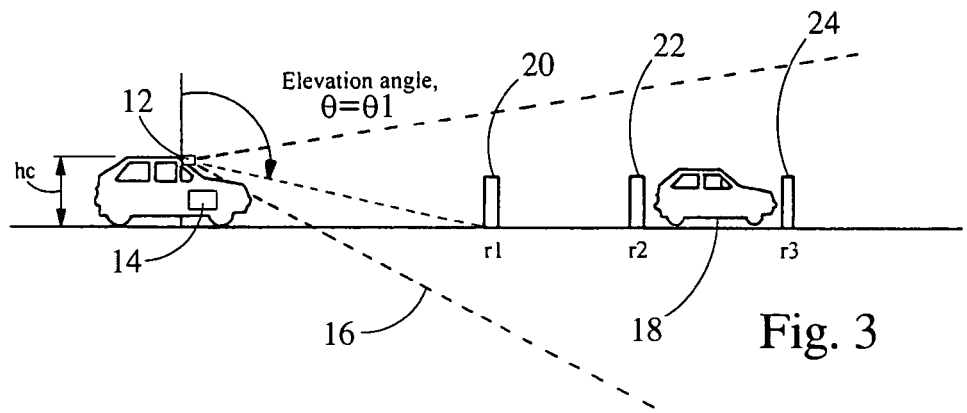
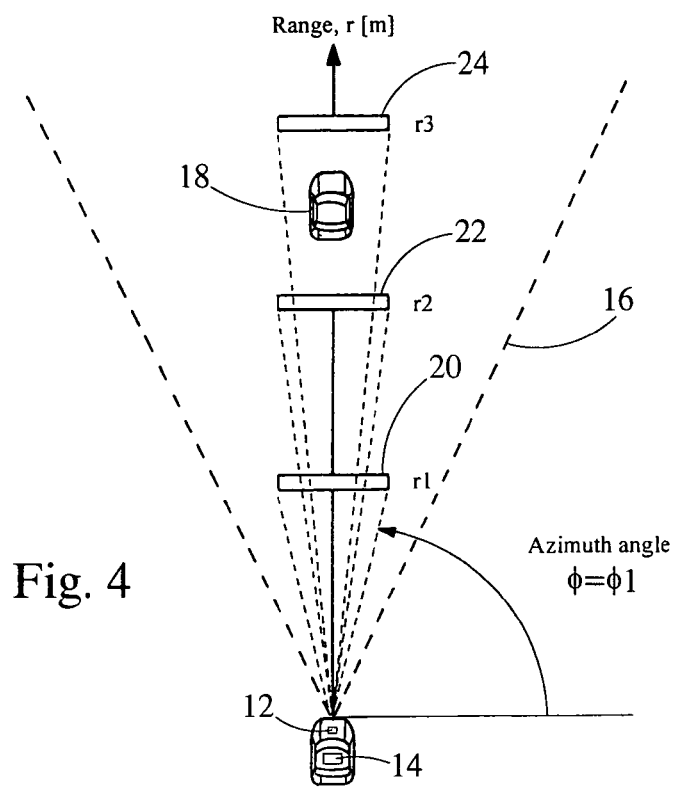
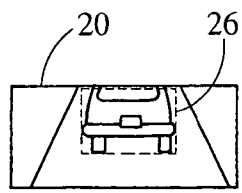 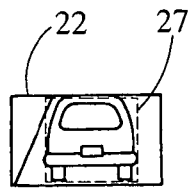 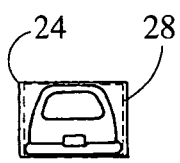
Fig. 5A     Fig. 5B     Fig. 5C

SINGLE CAMERA SYSTEM AND METHOD FOR RANGE AND LATERAL POSITION MEASUREMENT OF A PRECEDING VEHICLE

BACKGROUND

1. Field of the Invention

The present invention generally relates to a system and method for range and lateral position measurement of a preceding vehicle.

2. Description of Related Art

Radar and stereo camera systems for adaptive cruise control (ACC), have been already introduced into the market. Recently, radar has been applied to for pre-crash safety systems and collision avoidance. Typically, the range and lateral position measurement of a preceding vehicle is accomplished utilizing radar and/or stereo camera systems. Radar systems can provide a very accurate range. However, millimeter wave type radar systems such as 77 Ghz systems are typically quite expensive. Laser radar is low cost but is not effective in adverse weather. Further, radar generally is not well suited to identify the object and give an accurate lateral position.

Stereo cameras can determine the range and identity of an object. However, these systems do not perform well in adverse weather and are typically difficult to manufacture due to the accurate alignment required between the two stereo cameras and requires two image processors.

In view of the above, it can be seen that conventional ACC systems typically do not have a high cost-performance ratio even though they may perform to the desired functional requirements. Further, it is apparent that there exists a need for an improved system and method for measuring the range and lateral position of the preceding vehicle.

SUMMARY

In satisfying the above need, as well as overcoming the enumerated drawbacks and other limitations of the related art, the present invention provides a system for determining range and lateral position of a vehicle. The primary components of the system include a single camera and a processor. The camera is configured to view a region of interest containing a preceding vehicle and generate an electrical image of the region. The processor is in electrical communication with the camera to receive the electrical image. To analyze the electrical image, the processor identifies a series of windows within the image, each window corresponding to a fixed physical size at a different target range. For example, from the perspective of the camera the vehicle will appear larger when it is closer to the camera than if it is further away from the camera. Accordingly, each window is sized proportionally in the image as it would appear to the camera at each target range. The processor evaluates characteristics of the electrical image within each window to identify the vehicle. For example, the size of the vehicle is compared to the size of the window to create a size ratio. A score is determined indicating the likelihood that certain characteristics of the electrical image actually correspond to the vehicle and also that the vehicle is at the target range for that window.

In another aspect of the present invention, the characteristics of electrical image evaluated by the processor include the width and height of edge segments in the image, as well as, the height, width, and location of objects constructed from multiple edge segments. The position of the window in the electrical image is calculated based on the azimuth angle and the elevation angle of the camera.

In yet another aspect of the present invention, a method is provided for identifying the vehicle within the electrical image and determining the vehicle range. To simplify the image, an edge enhanced algorithm is applied to the image. Only characteristics of the electrical image within a particular window are evaluated. The edge enhanced image is binarized and segmented. The segments are evaluated and objects are constructed from multiple segments. A score is determined for each object based on criteria, such as, the object width, object height position, object height, and segment width. Based on the score of the object, the range of the object is estimated on the basis of the target range of the window.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is a side view of the system illustrating the calculation of the upper and lower edge of the windows in accordance with the present invention;

FIG. 4 is a top view of the system illustrating the calculation of the left and right edge of the windows, in accordance with the present invention;

FIG. 5A is a view of the electronic image, with only the image information in the first window extracted;

FIG. 5B is a view of the electronic image, with only the image information in the second window extracted;

FIG. 5C is a view of the electronic image, with only the image information in the third window extracted;

DETAILED DESCRIPTION

Figure 1:
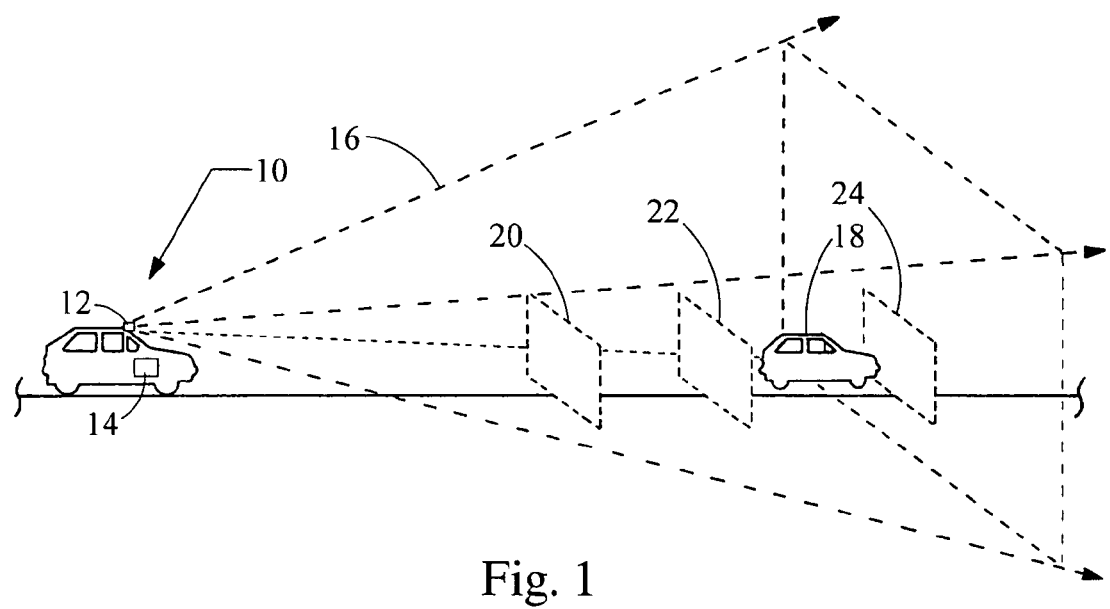
FIG. 1 is a side view of a system for range and lateral position measurement of a preceding vehicle, embodying the principles of the present invention.

Referring now to FIG. 1, a system embodying the principles of the present invention is illustrated therein and designated at 10. As its primary components, the system 10 includes a camera 12 and a processor 14. The camera 12 is located in the rearview mirror to collect an optical image of a region of interest 16 including a vehicle 18. The optical image received by the camera 12, is converted to an electrical image that is provided to the processor 14. To filter out unwanted distractions in the electronic image and aid in determining the range of the vehicle 18, the processor 14 calculates the position of multiple windows 20, 22, 24 within the region of interest 16. The windows 20, 22, 24 are located at varying target ranges from the camera 12. The size of the windows 20, 22, 24 are a predetermined physical size (about 4×2 m as shown) and may correspond to the size of a typical vehicle. To provide increased resolution the windows 20, 22, 24 are spaced closer together and the number of windows is increased. Although the system 10, as shown, is configured to track a vehicle 18 preceding the system 10, it is fully contemplated that the camera 12 could be directed to the side or rear the system 10 to track a vehicle 18 that may be approaching from other directions.

Figure 2:
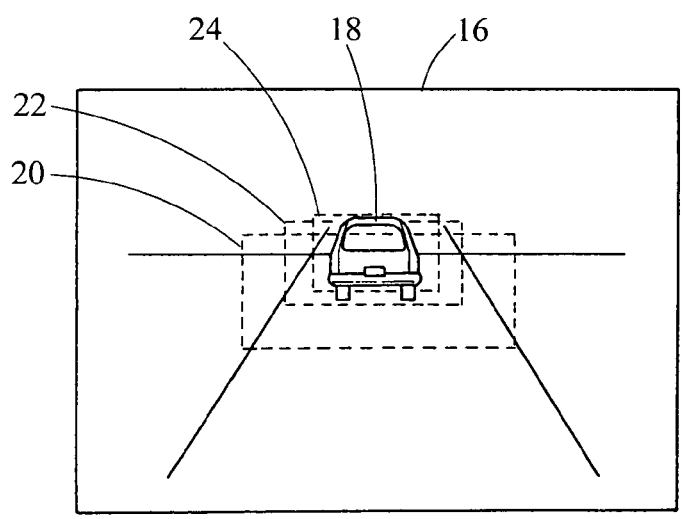
FIG. 2 is a view of an electronic image from the perspective of the camera in FIG. 1.

Now referring to FIG. 2, an electronic image of the region of interest 16 as viewed by the camera 12 is provided. The windows 20, 22, 24 are projected into their corresponding size and location according to the perspective of the camera 12. The vehicle 18 is located between windows 22 and 24, accordingly, the size of the vehicle 18 corresponds much more closely to the height and width of windows 22 and 24 than window 20. As can be seen from FIG. 1, although the size and width of the windows are physically constant at each target range, the window sizes appear to vary from the perspective of the camera 12. Similarly, the height and width of the preceding vehicle 18 will appear to vary at each target range. The perspective of the camera 12 will affect the apparent size and location of the preceding vehicle 18 within the electrical image based on the elevation angle and the azimuth angle of the camera 12. The processor 14 can use the location and size of each of the windows 20, 22, 24 to evaluate characteristics of the electrical image and determine a score indicating the probability the vehicle 18 is at the target range associated with a particular window.

Now referring to FIG. 3, a side view of the system 10 is provided illustrating the use of the elevation angle in calculating the height and position of the window 20 within the electrical image. The elevation angle is the angle between the optical axis of the camera 12 and the surface of the road. The lower edge of window 20 is calculated based on Equation (1).

$$\Theta_1 = a\tan(-hc/r1) \quad (1)$$

Where hc is the height of the camera 12 from the road surface, r1 is the horizontal range of window 20 from the camera 12, and the module is [0, 2π].

Similarly, the upper edge of the first window is calculated based on Equation (2).

$$\Theta_{1h} = a\tan((hw-hc)/r1) \quad (2)$$

Where hw is the height of the window, hc is the height of the camera 12 from the road surface, r1 is the range of window 20 from the camera 12, and the module is [0, 2π]. The difference, $\Delta\Theta_1 = \Theta_1 - \Theta_{1h}$, corresponds to the height of the window in the electronic image.

Now referring to FIG. 4, the horizontal position of the window in a picture corresponds to the azimuth angle. The azimuth angle is the angle across the width of the preceding vehicle from the perspective of the camera 12. The right edge of the range window 20 is calculated according to Equation (3).

$$\Phi_1 = a\tan(-\text{width}\_w/r1) + (\pi/2) \quad (3)$$

Similarly, the left edge of the range window 20 is calculated according to Equation (4).

$$\Phi_{1h} = a\tan(\text{width}\_w/r1) + (\pi/2) \quad (4)$$

Where window w is the distance from the center of the window 20 to the horizontal edges, r1 is the horizontal range of the window 20 from the camera 12, and the module is [0, 2π].

The window positions for the additional windows 22, 24 are calculated according to Equations (1)-(4), substituting their respective target ranges for r1.

Now referring to FIG. 5A, the electronic image is shown relative to window 20. Notice the width of the object 26 is about 30% of the width of the window 20. If the window width is set at a width of 4 m, about twice the expected width of the vehicle 18, the estimated width of the object 26 at a distance of r1 would equal 4×0.3=1.2 m. Therefore, the likelihood that the object 26 is the vehicle 18 at range r1 is low. In addition, the processor 14 evaluates vertical offset and object height criteria. For example, the distance of the object 26 from the bottom of the processing window 20 is used in determining likelihood that the object 26 is at the target range. Assuming a flat road, if the object 26 were at the range r1, the lowest feature of the object 26 would appear at the bottom of the window 20 corresponding to being in contact with the road at the target range. However, the object 26 in FIG. 5A, appears to float above the road, thereby decreasing the likelihood it is located at the target range. Further, the extracted object 26 should have a height of 0.5 m or 1.2 m. The processor 14 will detect an object height of 0.5 m if only the bottom portion of the vehicle 18 is detected or 1.2 m if the full height of the vehicle 18 is detected. The closer the height of the object 26 is to the expected height the more probable the object 26 is the vehicle 18 and the more probable it is located at the target range r1. The vertical offset, described above, may also affect the height of the object 26, as the top of the object, in FIG. 5A, is chopped off by the edge of the window 20. Therefore, the object 26 appears shorter than expected, again lowering the likelihood the object is the vehicle 18 at the range r1.

Now referring to FIG. 5B, the electronic image is shown relative to window 22. The width of the object 27 is about 45% of the window 22. Therefore, the estimated width of the object 27 at range r2 is equal to 4×0.45−1.8 m much closer to the expected size of the vehicle 18. In this image, the object 27 is only slightly offset from the bottom of the window 22, and the entire height of the object 27 is still included in the window 22.

Now referring to FIG. 5C, the electronic image is shown relative to window 24. The width of the object 28 is about 80% of the width of the window 24. Accordingly, the estimated width of the object 28 at range r3 is equal to 4×0.08=3.2 m. Therefore, the object width is significantly larger than the expected width of vehicle 18, usually about 1.75 m. Based on the object width, the processor 14 can make a determination that object 27 most probably corresponds to vehicle 18 and r2 is the most probable range. The range accuracy of the system 10 can be increased by using a finer pitch of target range for each window. Using a finer pitch between windows is especially useful as the vehicle 18 is closer to the camera 12, due to the increased risk of collision. Alternatively, interpolation may also be used to calculate a position between windows by identifying two most probable objects in successive windows, using the above mentioned criteria, and calculating a distance base on a weighting of each score and the corresponding target ranges.

Figure 6:
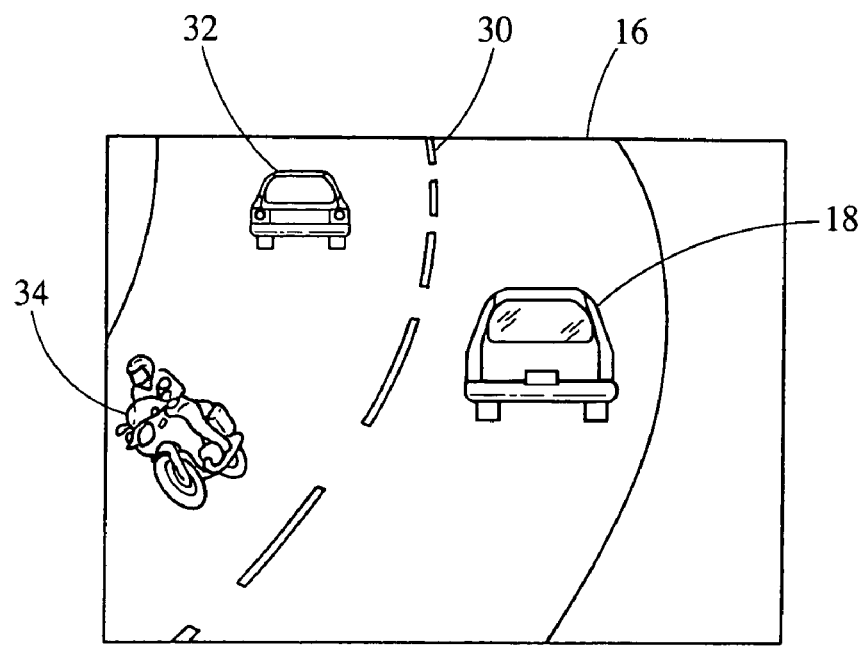
FIG. 6 is a view of an electronic image generated by the camera prior to processing.

Now referring to FIG. 6, a typical electronic image as seen by the camera 12 is provided and will be used to further describe the method implemented by the processor 14 to determine the range and lateral position of the vehicle 18. The electronic image includes additional features that could be confusing for the processor 14 such as the lane markings 30, an additional car 32, and a motorcycle 34.

Figure 7:
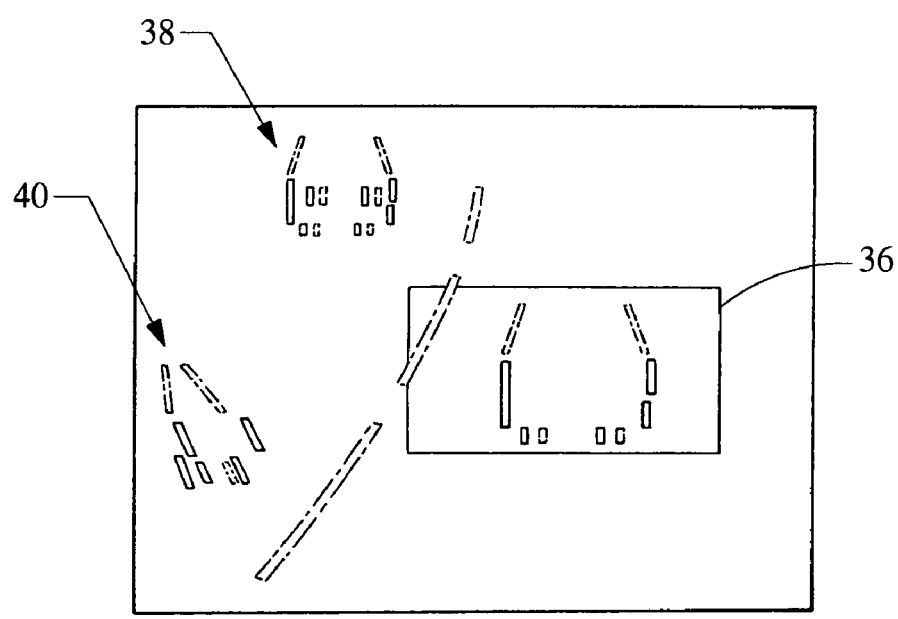
FIG. 7 is a view of the electronic image after a vertical edge enhancement algorithm has been applied to the electronic image.

FIG. 7 shows a vertically edge enhanced image. The electronic image is comprised of horizontal rows and vertical columns of picture elements (pixels). Each pixel contains a value corresponding to the brightness of the image at that row and column location. A typical edge enhancement algorithm includes calculating the derivative of the brightness across the horizontal rows or vertical columns of the image. However, many other edge enhancement techniques are contemplated and may be readily used. In addition, the position and size of the window 36 is calculated for a given target range. Edge information located outside the window 36 is ignored. In this instance, much of the edge enhanced information from the car 38 and the motorcycle 40 can be eliminated.

Figure 8:
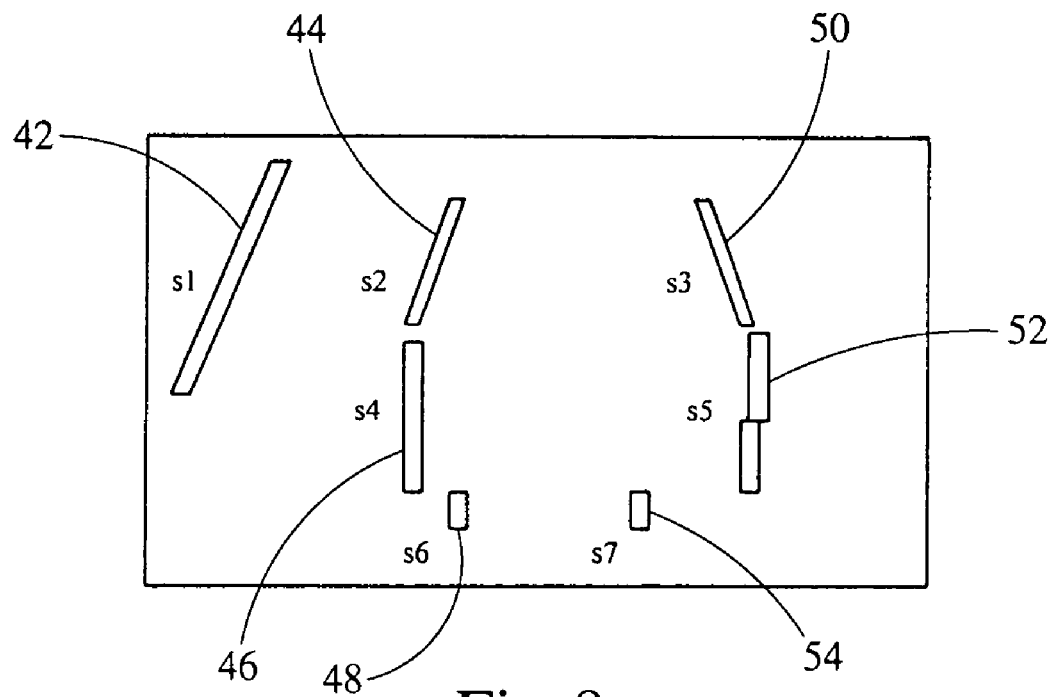
FIG. 8 is a view of the electronic image including segments that are extracted from the edge enhanced image.

Now referring to FIG. 8, the edge enhanced image is then binarized, meaning each of the pixels are set to a 1 or 0 value. A typical method for binarizing the image includes taking the absolute value of each pixel value and applying a threshold value, where if the brightness of the pixel value is above the threshold value, the pixel value is set to 1. Otherwise, the pixel value is set to 0. Although, the above described method is fast and simple, other more complicated thresholding methods may be used including local area thresholding or other commonly used approaches. Next, the pixels are grouped based on their relative position to other pixels having the same value. Grouping of these pixels is called segmentation and each of the groups is referred to as a segment. Height, width and position information is stored for each segment.

Relating these segments back to the original image, Segment 42 represents the lane marking on the road. Segment 44 represents the upper portion of the left side of the vehicle. Segment 46 represents the lower left side of the vehicle. Segment 48 represents the left tire of the vehicle. Segment 50 represents the upper right side of the vehicle. Segment 52 represents the lower right side of the vehicle while segment 54 represents the right tire.

Figure 9:
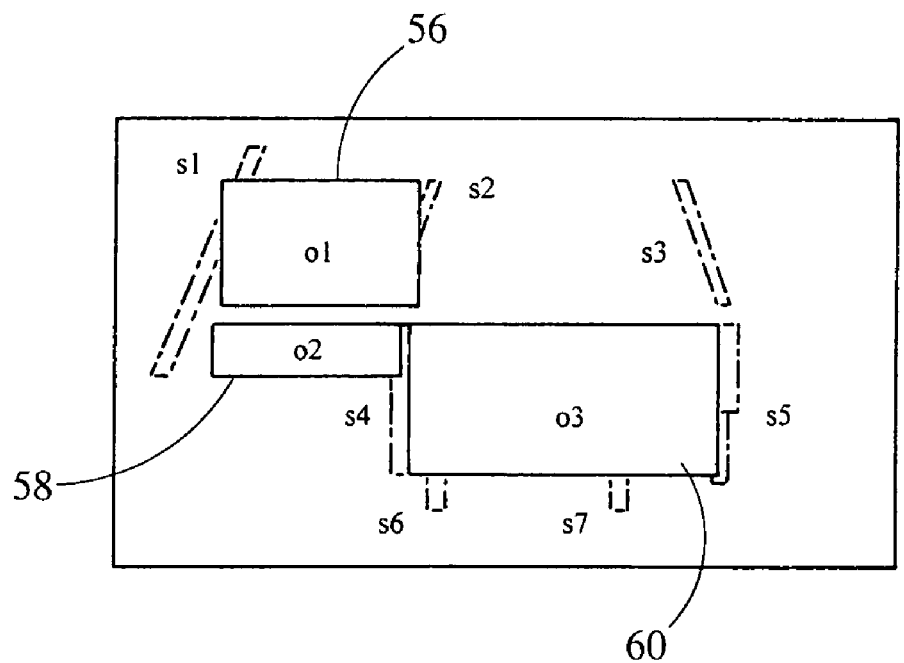
FIG. 9 is a view of the electronic image including objects constructed from the segments illustrated in FIG. 8.

Now referring to FIG. 9, objects may be constructed from two segments. Segment 42 and segment 44 are combined to construct object 56. Segment 42 and segment 46 are combined to construct object 58. In segment 46 and segment 52 are combined to construct object 60. Each of the objects are then scored based on the width of the object, the height of the object, the position of the object relative to the bottom edge of the window, the segment width, and the segment height. The above process is repeated for multiple windows with different target ranges. The object with the best score is compared with a minimum score threshold. If the best score is higher than the minimum score threshold the characteristics of the object are used to determine the object's range and lateral position.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A system for determining range of a vehicle, the system comprising:
    a camera configured to view a region of interest including the vehicle and generate an electrical image of the region;
    a processor in electrical communication with the camera to receive the electrical image, wherein the processor is configured to identify a plurality of windows within the electrical image, each window of the plurality of windows corresponding to a predetermined physical size at a target range from the camera, the processor being further configured to evaluate characteristics of the electrical image in relation to each window to identify the vehicle;
    wherein the processor is configured to determine a score indicating likelihood the vehicle is at the target range; and
    wherein the processor is configured to determine the score based on a size ratio between each window and the characteristics of the electrical image.

2. The system according to claim 1, wherein the predetermined physical size is based on vehicle characteristics.

3. The system according to claim 2, wherein the vehicle characteristics include a width of the vehicle.

4. The system according to claim 2, wherein the vehicle characteristics include a height of the vehicle.

5. The system according to claim 1, wherein the characteristics of the electrical image include edge segments within the electrical image.

6. The system according to claim 5, wherein the edge segments are vertical edge segments.

7. The system according to claim 5, wherein the characteristics of the electrical image include a height of the edge segments.

8. The system according to claim 5, wherein the characteristics of the electrical image include a width of the edge segments.

9. The system according to claim 5, wherein the characteristics of the electrical image include objects constructed from the edge segments.

10. The system according to claim 9, wherein the characteristics of the electrical image include a height of the objects.

11. The system according to claim 9, wherein the characteristics of the electrical image include a width of the objects.

12. The system according to claim 1, wherein a position of each window is determined based on the target range.

13. The system according to claim 1, wherein the window position is determined based on an elevation angle of the camera.

14. The system according to claim 13, wherein the lower edge of each window is calculated based on the relationship $\Theta_1 = \mathrm{atan}(-hc/r1)$ where hc is the height of the camera from the road surface, r1 is the range of window from the camera, and the module is $[0, 2\pi]$.

15. The system according to claim 13, wherein the upper edge of each window is calculated based on the relationship $\Theta_{1h} = \mathrm{atan}((hw-hc)/r1)$ where hw is a window height, hc is the height of the camera from the road surface, r1 is the range of window from the camera, and the module is $[0, 2\pi]$.

16. The system according to claim 1, wherein the position of each window is determined based on an azimuth angle of the camera.

17. The system according to claim 16, wherein the right edge of each window is calculated based on the relationship $\Theta_1 = \mathrm{atan}(-\mathrm{width\_w}/r1) + \pi/2$ where window w is the distance from the center of the window to the horizontal edges, r1 is the horizontal range of the window from the camera, and the module is $[0, 2\pi]$.

18. The system according to claim 16, wherein the left edge of each window is calculated based on the relationship $\phi_{1h} = \mathrm{atan}(\mathrm{width\_w}/r1) + \pi/2$ where window w is the distance from the center of the window to the horizontal edges, r1 is the horizontal range of the window from the camera, and the module is $[0, 2\pi]$.

19. A method for determining range of a vehicle the method comprising:
    using one or more processor to receive an optical image of a region of interest onto a camera; generating an electrical image based on the optical image; identifying a plurality of windows within the electrical image, each window corresponding to a predetermined physical size at a target range from the camera; and
    evaluating characteristics of the electrical image within each window to identify the vehicle;
    determining a score indicating likelihood the vehicle is at the target range based on a size ratio between each window and the characteristics of the electrical image.

20. The method according to claim 19, wherein the predetermined physical size is based on vehicle characteristics.

21. The method according to claim 20, wherein the vehicle characteristics include a width of the vehicle.

22. The method according to claim 20, wherein the vehicle characteristics include a height of the vehicle.

23. The method according to claim 19, wherein the characteristics of the electrical image include edge segments within the electrical image.

24. The method according to claim 23, wherein the edge segments are vertical edge segments.

25. The method according to claim 23, wherein the characteristics of the electrical image include a height of the edge segments.

26. The method according to claim 23, wherein the characteristics of the electrical image include a width of the edge segments.

27. The method according to claim 23, wherein the characteristics of the electrical image include objects constructed from the edge segments.

28. The method according to claim 27, wherein the characteristics of the electrical image include a height of the objects.

29. The method according to claim 27, wherein the characteristics of the electrical image include a width of the objects.

30. The method according to claim 19, wherein a position of each window is determined based on the target range.

31. The method according to claim 19, wherein the window position is determined based on an elevation angle of the camera.

32. The method according to claim 31 wherein the lower edge of each window is calculated based on the relationship $\Theta_1 = \operatorname{atan}(-hc/r1)$ where hc is the height of the camera from the road surface, r1 is the range of window from the camera, and the module is $[0, 2\pi]$.

33. The method according to claim 31, wherein the upper edge of each window is calculated based on the relationship $\Theta_{1h} = \operatorname{atan}((hw-hc)/r1)$ where hw is a window height, hc is the height of the camera from the road surface, r1 is the range of window from the camera, and the module is $[0, 2\pi]$.

34. The method according to claim 19, wherein the position of each window is determined based on an azimuth angle of the camera.

35. The method according to claim 34, wherein the right edge of each window is calculated based on the relationship $\Phi_1 = \operatorname{atan}(-\text{width\_w}/r1) + \pi/2$ where window w is the distance from the center of the window to the horizontal edges, r1 is the horizontal range of the window from the camera, and the module is $[0, 2\pi]$.

36. The method according to claim 34, wherein the left edge of each window is calculated based on the relationship $\Phi_{1h} = \operatorname{atan}(\text{width\_w}/r1) + \pi/2$ where window w is the distance from the center of the window to the horizontal edges, r1 is the horizontal range of the window from the camera, and the module is $[0, 2\pi]$.

37. The method according to claim 19, wherein evaluating characteristics of the electrical image includes performing an edge enhancement algorithm to the electrical image.

38. The method according to claim 37, wherein the edge enhancement algorithm is a vertical edge enhancement algorithm.

39. The method according to claim 37, wherein evaluating characteristics of the electrical image includes extracting only the electrical image within the window.

40. The method according to claim 37, wherein evaluating characteristics of the electrical image includes binarizing the electrical image utilizing a threshold.

41. The method according to claim 37, wherein evaluating characteristics of the electrical image includes identifying segments from the binarized image.

42. The method according to claim 41, wherein evaluating characteristics of the electrical image includes constructing objects from the segments.

43. The method according to claim 42, wherein evaluating the electrical image, includes determining a score for each object based on the object width, object height position, object height, and segment width.

44. The method according to claim 43, wherein evaluating characteristics of the electrical image, further includes determining a range of the object that is based on the score of the object.

* * * * *

UNITED STATES PATENT AND TRADEMARK OFFICE
CERTIFICATE OF CORRECTION

PATENT NO. : 7,561,720 B2  Page 1 of 1
APPLICATION NO. : 10/836501
DATED : July 14, 2009
INVENTOR(S) : Shunji Miyahara It is certified that error appears in the above-identified patent and that said Letters Patent is hereby corrected as shown below:

On the Title Page

Item (75), replace "Yokohama" with --Yokohama-shi--.

Page 2

Right column, under "OTHER PUBLICATIONS", insert the following:

--Dagan et al., Forward Collision Warning with a Single Camera, IEEE Intelligent Vehicles Symposium 14-17, June 2004, pages 37-42--.

In the Claims

In column 6, claim 17, line 45, before "=atan" replace "$\theta_1$" with --$\phi_1$--.

Signed and Sealed this

Ninth Day of March, 2010

David J. Kappos
*Director of the United States Patent and Trademark Office*